(12) United States Patent
Hayakawa

(10) Patent No.: US 9,706,793 B2
(45) Date of Patent: Jul. 18, 2017

(54) STERILIZATION TREATMENT LINE AND CLEANING METHOD THEREOF

(71) Applicant: DAI NIPPON PRINTING CO., LTD., Tokyo (JP)

(72) Inventor: Atsushi Hayakawa, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 32 days.

(21) Appl. No.: 14/352,138

(22) PCT Filed: Oct. 23, 2012

(86) PCT No.: PCT/JP2012/077334
§ 371 (c)(1),
(2) Date: Apr. 16, 2014

(87) PCT Pub. No.: WO2013/061955
PCT Pub. Date: May 2, 2013

(65) Prior Publication Data
US 2014/0286822 A1  Sep. 25, 2014

(30) Foreign Application Priority Data

Oct. 25, 2011  (JP) .................................. 2011-233683

(51) Int. Cl.
*A23L 3/00* (2006.01)
*A23L 3/18* (2006.01)
(Continued)

(52) U.S. Cl.
CPC ................. *A23L 3/001* (2013.01); *A23L 2/46* (2013.01); *A23L 3/18* (2013.01); *B08B 9/027* (2013.01); *B65B 55/14* (2013.01); *B65B 2210/06* (2013.01)

(58) Field of Classification Search
CPC ..... A23L 3/001; A23L 2/46; A23L 3/18; B08B 9/027; B65B 55/14
See application file for complete search history.

(56) References Cited

U.S. PATENT DOCUMENTS 2,937,856 A * 5/1960 Thomson ........................ 165/66
3,041,046 A * 6/1962 Nellis, Jr. et al. ............ 165/234
(Continued)

FOREIGN PATENT DOCUMENTS

EP     1415551       5/2004
JP     59-132875     7/1984
(Continued)

OTHER PUBLICATIONS

International Search Report, PCT/JP2012/077334, Jan. 22, 2013.
European Patent Office Action for Patent Application No. 12843487.5 dated Jun. 2, 2016.

*Primary Examiner* — Regina M Yoo
(74) *Attorney, Agent, or Firm* — Young & Thompson

(57) ABSTRACT

Provided is a sterilization processing line resulting from an upstream tank (16) and a downstream tank (17) that each retain a product liquid being connected by a duct (18) that transfers the product liquid, a high-temperature heating unit (21) that sterilizes the product liquid being provided to the intermediate section of the duct, one or a plurality of stages of heating units (22, 23) that heat the product liquid in stages being provided to the duct reaching from the upstream tank to the high-temperature heating unit, and one or a plurality of stages of cooling units (24, 25, 26) that cool the product liquid in stages being provided to the duct reaching from the high-temperature processing unit to the downstream tank. A plurality of parallel intermediate duct systems (P, Q) are provided at the interval from the heating unit (23) at the stage that is in a temperature range at which burning to the product liquid can occur to the cooling unit (24) at the stage (Continued)

that similarly is in the temperature range at which burning to the product liquid can occur, and the sterilization processing and the CIP and positive pressure holding processing of the product liquid transferred from the upstream tank to the downstream tank are performed switching between the parallel plurality of intermediate duct systems.

4 Claims, 8 Drawing Sheets

(51) Int. Cl.
  *B65B 55/14* (2006.01)
  *A23L 2/46* (2006.01)
  *B08B 9/027* (2006.01)

(56) References Cited

U.S. PATENT DOCUMENTS

| | | | | |
|---|---|---|---|---|
| 3,473,934 | A | * | 10/1969 | Pech ............................ 426/407 |
| 4,310,476 | A | * | 1/1982 | Nahra et al. .................. 261/118 |
| 4,313,370 | A | * | 2/1982 | Skoli et al. ................... 99/323.1 |
| 4,416,194 | A | * | 11/1983 | Kemp ............................ 99/275 |
| 4,419,301 | A | * | 12/1983 | Nahra et al. .................. 261/118 |
| 4,534,986 | A | * | 8/1985 | Hasting ......................... 426/521 |
| 4,591,463 | A | * | 5/1986 | Nahra et al. .................. 261/116 |
| 4,667,590 | A | * | 5/1987 | Balaam ..................... A23L 3/18 |
| | | | | 165/109.1 |
| 4,738,302 | A | | 4/1988 | Abma |
| RE32,695 | E | * | 6/1988 | Nahra et al. .................. 261/118 |
| 5,503,064 | A | * | 4/1996 | Scheel et al. ................... 99/453 |
| 6,014,994 | A | | 1/2000 | Schmidt |
| 6,136,362 | A | * | 10/2000 | Ashton ........................ 426/521 |
| 6,599,546 | B2 | * | 7/2003 | Palaniappan ................ 426/231 |
| 7,186,430 | B2 | * | 3/2007 | Feldmeier .................... 426/521 |
| 7,416,644 | B2 | * | 8/2008 | Bonde ............................ 203/14 |
| 7,435,440 | B2 | * | 10/2008 | Feldmeier .................... 426/519 |
| 9,055,756 | B2 | * | 6/2015 | Lambert |
| 2002/0172745 | A1 | * | 11/2002 | Palaniappan ................ 426/521 |
| 2005/0126124 | A1 | * | 6/2005 | Munzer ..................... A23L 3/00 |
| | | | | 53/415 |
| 2011/0180232 | A1 | * | 7/2011 | Lambert ......................... 165/10 |
| 2011/0293472 | A1 | * | 12/2011 | McSherry et al. .............. 422/29 |
| 2013/0029394 | A1 | * | 1/2013 | Toll et al. ..................... 435/167 |
| 2014/0013653 | A1 | * | 1/2014 | Lander ......................... 43/132.1 |
| 2014/0127786 | A1 | * | 5/2014 | Iversen ....................... 435/252.1 |

FOREIGN PATENT DOCUMENTS

| | | |
|---|---|---|
| JP | 02-242782 | 9/1990 |
| JP | 07-107949 | 4/1995 |
| JP | 2000-153245 | 6/2000 |
| JP | 2007-022600 | 2/2007 |
| JP | 2007-331801 | 12/2007 |

\* cited by examiner

STERILIZATION TREATMENT LINE AND CLEANING METHOD THEREOF

TECHNICAL FIELD

The present invention relates to a line for performing sterilization treatment to product liquid such as drink and a method of cleaning the sterilization treatment line.

BACKGROUND TECHNOLOGY

Conventionally, to a piping line or arrangement in an aseptic filling system for drink or like, in order to remove dirt or bacteria adhering to an inside of a conduit, a CIP (Cleaning In Place) treatment and SIP (Sterilization In Place) treatment are performed (for example, refer to Patent Document 1, paragraph [0003]).

The CIP treatment is performed, for example, by adding alkaline cleaner such as caustic soda or acidic cleanser to water and circulating such water through a fluid food filling path. According to such treatment, dirt such as remaining material or like adhering to the fluid food filling path can be removed (for example, refer to Patent Documents 1, 2, and 3).

The SIP treatment is performed, for example, by circulating steam or heated water through the fluid food filling path cleaned in the CIP treatment mentioned above. According to such treatment, the interior of the fluid food filling path can be sterilized to thereby provide an aseptic condition (for example, refer to paragraph [0003] of Patent Document 1).

Incidentally, a sterilization treatment line is provided inside a conduit line of an aseptic filling system treating a large amount of product liquid.

Such sterilization treatment line is provided with, though not shown, an upstream side tank for storing a product liquid such as prepared drink and a downstream side tank for storing the sterilized product liquid and supplying the product liquid to a filling machine. The upstream side tank and the downstream side tank are connected through conduit transferring the product liquid, and a high-temperature heating unit for sterilizing the product liquid is provided for an intermediate portion of the conduit. Further, two stages of heating units or sections for heating the product liquid in a stepwise manner are formed to portions of the conduit extending from the upstream side tank toward the high-temperature heating units, and three stages of cooling units or sections for cooling the product liquid in a stepwise manner are formed to portions of the conduit extending from the high-temperature heating unit toward the downstream side tank. By arranging a plurality of stages of the heating units and cooling units, as mentioned above, even a large amount of the product liquid can be properly and smoothly heated to a sterilizing temperature and cooling the product liquid to a normal temperature.

When a container such as PET bottle is filled up with the product liquid by using a filling machine, the product liquid in the upstream side tank is transferred toward the downstream side tank through the conduit under pressure, and in general, during this transferring process, the product liquid is heated in the first stage heating unit from the normal temperature to a temperature of about 65° C., heated in the second stage heating unit from about 65° C. to about 140° C., and maintained in the third stage heating unit at about 140° C. for about 30 to 60 seconds to thereby subjected to the sterilization treatment. Thereafter, the product liquid is cooled in the first stage cooling unit from about 140° C. to about 90° C., cooled in the second stage cooling unit from about 90° C. to about 45° C., and cooled in the third stage cooling unit from about 45° C. to about 30° C. The downstream side tank is filled up with the product liquid of the temperature of about 30° C. from the third stage cooling unit, and the product liquid is then transferred to the filling machine to fill a number of containers such as PET bottles which are conveyed at high speed.

Further, another piping line like the piping line extending from the first stage heating unit to the third stage cooling section is also arranged in parallel therewith. According to such arrangement, even if an accident in which a defective matter such as burning is caused to the product liquid in one of the piping lines by heating, this one piping line is shut off (blocked off), and by using another one piping line, the sterilized product liquid can be transferred to the filling machine. During the operation of such another piping line while sterilizing the product liquid and supplying it to the filling machine, various treatments such as CIP, SIP and positive pressure keeping or maintaining treatments will be performed by suing a CIP-SIP-positive pressure keeping apparatus.

PRIOR ART DOCUMENT

Patent Document

Patent Document 1: Japanese Patent Laid-open Publication No. 2007-22600
Patent Document 2: Japanese Patent Laid-open Publication No. 2007-331801
Patent Document 3: Japanese Patent Laid-open Publication No. 2000-153245

SUMMARY OF THE INVENTION

Problems to be Solved by the Invention

In the conventional product liquid sterilization treatment line, it is possible to perform, in parallel, the sterilization treatment and the CIP treatment to the product liquid by alternately switching the two piping lines, so that productivity of product liquid packages can be enhanced.

However, the above arrangement of the piping lines requires a wide installation space and excessive cost, and accordingly, if such piping lines are provided in two lines, the sterilization system is itself made large in size and extremely increase a system installation cost. Moreover, the CIP treatment, SIP treatment and like treatment require much time, increased amount of chemical liquid to be used, and a lot of energy to be utilized.

In order to solve the problem mentioned above, an object of the present invention is to provide a sterilization treatment line and a cleaning method thereof.

Means for Solving the Problem

To achieve the above object, the present invention adopts the following configurations.

It is further to be noted that, in the following, although reference numerals described in the drawings are added with parentheses, the present invention is not limited to them.

That is, the invention defined in claim 1 adopts a cleaning method of a sterilization treatment line in which an upstream side tank (16) in which product liquid is stored and a downstream side tank (17) are connected to each other through a conduit (18) through which the product liquid is transferred, a high-temperature heating unit (21a, 21b) for sterilizing the product liquid is provided at an intermediate portion of the conduit, one or more stages of heating units (22, 23a, 23b) heating the product liquid in a stepwise manner are provided for the conduit at portions between the upstream side tank (16) and the high-temperature heating unit (21a, 21b), and one or more stages of cooling units (24a, 24b, 25, 26) cooling the product liquid in a stepwise manner are provided for the conduit at portions between the high-temperature heating unit (21a, 21b) and the downstream side tank (17), wherein a plurality of intermediate piping lines (P, Q), are arranged in parallel with each other at portions between a certain stage of the heating unit (23 a, 23b) disposed in a temperature range at which the product liquid is burnt and a certain stage of the cooling unit (24 a, 24b) disposed in a temperature range at which the product liquid is burnt, and a sterilization treatment and a CIP treatment following which performed a positive pressure keeping treatment with respect to the product liquid to be transferred from the upstream side tank (16) to the downstream side tank (17) are performed by switching the plural intermediate piping lines (P, Q) arranged in parallel with each other.

As defined in claim 2, in the cleaning method of the sterilization treatment line defined in claim 1, it may be possible to perform an SIP treatment at an interval between the CIP treatment and the positive pressure keeping treatment.

As defined in claim 3, in the cleaning method of the sterilization treatment line defined in claim 1, it may be desired that the temperature range at which the product liquid is burnt is a temperature range from 60° C. to 150° C.

The invention defined in claim 4 adopts a configuration of a sterilization treatment line in which an upstream side tank (16) in which product liquid is stored and a downstream side tank (17) are connected to each other through a conduit (18) through which the product liquid is transferred, a high-temperature heating unit (21a, 21b) for sterilizing the product liquid is provided at an intermediate portion of the conduit, one or more stages of heating units (22, 23 a, 23b) heating the product liquid in a stepwise manner are provided for the conduit at portions between the upstream side tank (16) and the high-temperature heating unit (21a, 21b), and one or more stages of cooling units (24 a, 24b, 25, 26) cooling the product liquid in a stepwise manner are provided for the conduit at portions between the high-temperature heating unit (21, 21b) and the downstream side tank (17), wherein a plurality of intermediate piping lines (P, Q) are arranged in parallel with each other at portions between a certain stage of heating unit (23 a, 23b) disposed in a temperature range at which the product liquid is burnt and a certain stage of the cooling unit (24a, 24b) disposed in a temperature range at which the product liquid is burnt, and a sterilization treatment and a CIP treatment following which performed a positive pressure keeping treatment with respect to the product liquid to be transferred from the upstream side tank (16) to the downstream side tank (17) are performed by switching the plural intermediate piping lines (P, Q) arranged in parallel with each other.

As defined in claim 5, in the sterilization treatment line defined in claim 4, it may be desired to dispose a unit that prevents fluid other than the product liquid from being mixed with the product liquid flowing in the intermediate piping line.

Effects of the Invention

According to the present invention, only certain intermediate piping lines of a plurality of the intermediate piping lines are disposed in parallel with each other in the sterilization treatment line in which burning of the product liquid is liable to occur, so that the sterilization treatment line can be made downsized and compact, and in addition, the CIP treatment and the positive pressure keeping treatment can be performed only to the intermediate piping line in which the burning occurs. Accordingly, the CIP treatment or like treatment can be performed for a short time, which results in small amount of chemical liquid to be used, thus being economical.

Furthermore, since the intermediate piping lines can be cleansed during the production and filling of the product liquid, it is not necessary to use an expensive chemical agent having high cleaning function for shortening the CIP treatment time, and it is possible to use a cheap chemical agent having relatively low cleaning function a relatively long time for cleaning.

BRIEF DESCRIPTION OF THE INVENTION

MODE FOR EMBODYING THE INVENTION

Hereunder, modes for embodying the present invention will be explained with reference to the accompanying drawings.

Figure 1:
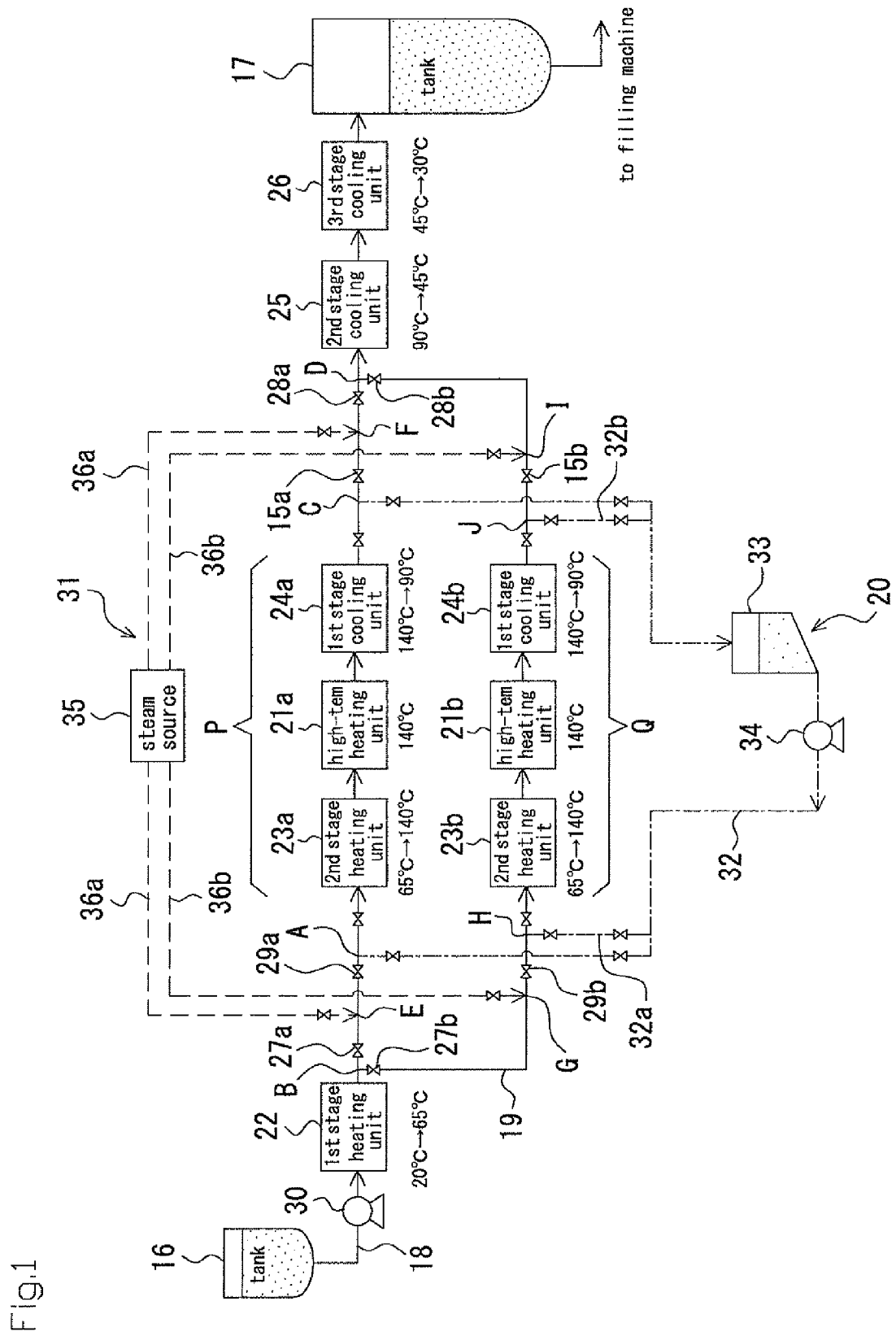
FIG. 1 is a block diagram of a sterilization treatment line according to the present invention.

A sterilization treatment line such as shown in FIG. 1 is installed in a piping line of an aseptic filling system treating a large volume of product liquid such as drink.

With reference to FIG. 1, reference numeral 16 denotes an upstream side tank for storing a product liquid such as drink prepared but not sterilized, and reference numeral 17 denotes a downstream side tank for once storing the sterilized product liquid and then supplying it to a filling machine, not shown.

The respective upstream side tank 16 and downstream side tank 17 are capable of storing a large volume of product liquid, and for example, it is possible to store several tons or ten-and-several tons of product liquid. Further, in the upstream side tank 16, the product liquid before the sterilization treatment is stored at a normal temperature of, for example, about 20° C., and on the other hand, in the downstream side tank 17, the product liquid after the sterilization treatment is stored at a normal temperature of, for example, about 30° C.

As a filling machine, there is adopted a system, though not shown, capable of injecting the product liquid after the sterilization treatment by inserting nozzles travelling at high speed into containers such as PET bottles that also travels at high speed with a predetermined interval around a wheel disposed horizontally. A capper is coupled with the filling machine. The capper also travels at high speed around the periphery of the similar wheel to travel the containers such as PET bottles after the filling of the product liquid at a predetermined interval, and the mouth portion of the container filled up with the product liquid is capped by the capper.

The upstream side tank 16 and the downstream side tank 17 are connected by means of first conduit 18, and a pump 30 for transferring the product liquid under pressure is provided at a portion of the first conduit on the side of the upstream tank 16.

A high temperature heating unit 21a for sterilizing the product liquid is provided at an intermediate portion of the first conduit 18. This high temperature unit 21a is, for example, composed of a heat exchanger for heating the product liquid in a long tube, for example, while continuously flowing the product liquid in the tube to thereby heat the product liquid to temperature of, for example, 140° C. At that time, the product liquid flows in the heat exchanger with a flowing time of 30 to 60 seconds, and is continuously heated under temperature of 140° C., thus sterilizing the product liquid.

A two-staged heating unit 22 is provided at a portion of the first conduit 18 between the upstream side tank 16 and the high temperature heating unit 21a so as to heat the product liquid in a stepwise manner. The number of such stages may be optionally determined, and the location of more than two stages enables temperature increasing interval from the normal temperature to the sterilizing temperature to be finely divided.

The first stage heating unit 22 is, for example, composed of a plurality of plate-type heat exchangers which are arranged in series and adapted to heat the product liquid transferred under pressure by the pump 30 from the upstream side tank 16 to a temperature of 65° C. from a temperature of 20° C. A second stage heating unit 23a is composed of a plurality of plate-type heat exchangers of the number more than those in the first stage heating unit 22 so as to heat the product liquid transferred from the first stage heating unit 22 to a temperature of 140° C. from the temperature of 65° C. The product liquid of the temperature of 140° C. is transferred to the high-temperature heating unit 21a and then transferred through the high-temperature heating unit 21 to the next stage of a cooling unit while maintaining the temperature of 140° C.

As mentioned above, since the product liquid reaches the high temperature heating unit 21a through the plural heating stages of the heating units 22 and 23a, even if the product liquid is transferred at high speed, the product liquid can be smoothly heated to the high temperature.

Cooling units 24a, 25 and 26 for cooling the product liquid in the stepwise manner are provided at three stages of first, second and third stages at portions of the first conduit 18 between the high-temperature heating unit 21a to the downstream side tank 17. The number of these stages of the cooling units 24a, 25 and 26 may be optionally changed, and by providing stages less or more than three stages, temperature decreasing interval from the sterilizing temperature to the normal temperature may be more finely divided.

The first stage cooling unit 24a is, for example, composed of a plurality of plate-type heat exchangers connected in series so as to cool the sterilized product liquid transferred under pressure by the pump 30 from the high-temperature heating unit 21a to the temperature 90° C. from the temperature of 140° C. The second stage cooling unit 25 is composed of plate-type heat exchangers of the number equal to or less than those of the first stage cooling unit 24 connected in series and adopted to cool the product liquid from the first stage cooling unit 24a to the temperature of 45° C. from the temperature of 90° C. Furthermore, the third stage cooling unit 26 is composed of plate-type heat exchangers of the number equal to or less than those of the second stage cooling unit 25 connected in series and adopted to cool the product liquid from the second stage cooling unit 25 to the temperature of 30° C. from the temperature of 45° C. The product liquid thus cooled to the temperature of 30° C. is then transferred to the downstream side tank 17, and thereafter, fed to the filling machine, not shown.

As mentioned hereinabove, the product liquid flows in and through the first conduit 18 and reaches the downstream side tank 17 from the high-temperature heating unit 21a through a plural stages of the cooling units 24a, 25 and 26, and accordingly, even if the product liquid flows at high speed, the product liquid can be cooled smoothly to the normal temperature.

The product liquid, of the normal temperature after the sterilization treatment, flowing in the downstream side tank 17 is transferred to the filling machine by which the product liquid fills a number of containers such as PET bottles travelling at high speed.

Furthermore, in the present embodiment, as shown in FIG. 1, another intermediate piping line Q of the structure similar to that of the intermediate piping line P between the second stage heating unit 23a to the first stage cooling unit 24a in the sterilization treatment line connecting the upstream side tank 16 and the downstream side tank 17 is arranged in parallel with the intermediate piping line P. That is, the intermediate piping line Q has a second conduit 19 having one end coupled with a coupling point B of the first conduit 18 between the first stage heating unit 22 and the second stage heating unit 23a and another end coupled with a coupling point D between the first stage cooling unit 24a and the second stage cooling unit 25, and the second stage heating unit 23b, the high-temperature heating unit 21b and the first stage cooling unit 24a are provided to the second conduit 19.

In the present embodiment, the product liquid is not burnt in the set temperature range of the first stage heating unit 22, but may be burnt in the set temperature range of the second heating units 23a, 23b. Further, the product liquid is also burnt in the set temperature range of the first stage cooling units 24a, 24b, but may be not burnt in the set temperature ranges of the second stage cooling unit 25 and the third stage cooling unit 26. In such case, although the temperature range at which the product liquid is burnt is more than 60° C. at which protein is denatured, since the product liquid flows fast in the first stage heating unit 22 and the second stage cooling unit 25, the product liquid is not burnt.

Further, as mentioned above, the number of stages of the heating units 22, 23a, 23b, 21a, 21b and the number of stages of the cooling units 24a, 24b, 25, 26 may be changed as occasion demands, and in such occasion, the number of the stages of the heating units and cooling units at which the product liquid is burnt may be of course changed.

As shown in FIG. 1, the first and second conduits 18 and 19 are equipped with a CIP system 20, an SIP system 31 and a positive pressure keeping system, not shown, for performing the CIP treatment, the SIP treatment and the positive pressure keeping treatment, respectively, with respect to all the sterilization treatment line.

The CIP line 20 is provided for cleaning the insides of the conduits 18, 19, the respective heating units 22, 23, 21, and the respective cooling units 24, 25, 26 by flowing cleaning liquid such as acidic liquid or alkaline liquid throughout the conduits 18 and 19, and the CIP line 20 is provided with a conduit 32 for the CIP treatment (CIP conduit 32) having one end connected to the first conduit 18 at a portion between the first stage heating unit 22 and the second stage heating unit 23a and another one end thereof connected to the first conduit 18 at a portion between the first stage cooling unit 24a and the second stage cooling unit 25.

It is however noted that a connection point A at which the CIP conduit 32 is connected to the first conduit 18 is positioned on downstream side from a connection point B at which the one end of the second conduit 19 is connected to the first conduit 18. Further, a connection point C at which the other end of the CIP conduit 32 is connected to the first conduit 18 is positioned on the upstream side from a connection point D at which the other end of the second conduit 19 is connected to the first conduit 18.

Furthermore, branch pipes 32a and 32b are provided in a manner such that one ends thereof intersect with the second conduit 19 at a portion between the first stage heating unit 22 and the second stage heating unit 23b and a portion between the first stage cooling unit 24b and the second stage cooling unit 25, respectively, and other ends thereof intersect with the CIP conduit 32.

A tank 33 for storing cleaning liquid and a pump 34 for feeding the cleaning liquid under pressure are arranged between both the branch pipes 32a and 32b of the CIP conduit 32.

Various-types of valves are provided for the first and second conduits 18, 19, the CIP conduit 32 and both the branch pipes 32a, 32b at predetermined portions, respectively. These valves perform predetermined operations, as mentioned hereinafter, to flow the cleaning liquid inside one or all of the conduits 18 and 19, thereby cleaning the conduits, the heating units and the cooling units.

On the other hand, the SIP system 31 is provided with a steam source 35 for supplying steam having high temperature and high pressure and also includes steam conduits 36a and 36b that extend from the steam source 35 to the conduits 18 and 19.

The steam conduit 36a has one end intersecting with the first conduit 18 at a portion between the first stage heating unit 22 and the second stage heating unit 23b and another end intersecting therewith at a portion between the first stage cooling unit 24b and the second stage cooling unit 25. On the other hand, the steam conduit 36b has one end intersecting with the second conduit 19 at a portion between the first stage heating unit 22 and the second stage heating unit 23b and another end intersecting therewith at a portion between the first stage cooling unit 24b and the second stage cooling unit 25.

It is however noted that a connection point E at which the one end of the steam conduit 36a is connected to the conduit 18 is positioned between the connection points A and B, and a connection point F at which the other end of the steam conduit 36a is connected to the conduit 18 is positioned between the connection points C and D. Further, a connection point G at which the one end of the steam conduit 36b is connected to the conduit 19 is positioned between a connection point H at which the branch pipe 32a is connected to the conduit 19 and the connection point B, and a connection point I at which the other end of the steam conduit 36b is connected to the conduit 19 is positioned between the connection point J at which the branch pipe 32b is connected to the conduit 19 and the connection point D.

Various-types of valves are provided for the steam conduits 36a and 36b at predetermined portions, respectively. These valves perform predetermined operations, in a manner similar to those mentioned with respect to the CIP system 20, to flow the cleaning liquid inside one or all of the conduits 18 and 19, thereby cleaning the conduits, the heating units and the cooling units.

The positive pressure keeping system is a system for supplying the aseptic air to the conduits 18 and 19 after the CIP treatment or SIP treatment, and includes, though not shown, a source for generating the aseptic air and aseptic air conduits extending toward the conduits 18 and 19 from the aseptic air source in parallel with the steam conduits 36a and 36b. The aseptic air conduits may be replaced with the steam conduits 36a and 36b.

As mentioned above, by arranging a plurality of intermediate piping lines P and Q, in a case when a defect or failure such as burning to the product liquid by heating occurs in one intermediate piping line P during the transfer of the product liquid, while heating and sterilizing the product liquid, from the upstream side tank 16 to the downstream side tank 17, the intermediate piping line P is shut off (blocked off) and the flow path is switched to the other intermediate piping line Q, thereby continuously delivering the sterilized product liquid to the filling machine.

Further, the intermediate piping line P that is caused by defect is subjected to the CIP treatment, and if necessary, additionally to the SIP treatment during the supply of the product liquid to the filling machine through the other intermediate piping line Q. Since these intermediate piping lines P and Q each has a length corresponding to a distance between the second stage heating unit 23a, 23b and the first state cooling units 24a, 24b, respectively, various treatments such as CIP treatment and SIP treatment can be easily and promptly performed.

When it is required for the intermediate piping lines P and Q to be switched, there may be provided means for preventing foreign liquid or like other than the product liquid from being mixed with the product liquid in the intermediate piping lines P and Q.

This mixing prevention means is specifically composed of valves 27a, 27b, 28b and 28b as shown in FIG. 1. The valves 27a and 27b are arranged at portions near the downstream side of the upstream side connection point B of the conduits 18 and 19, and on the other hand, the valves 28a and 28b are arranged at portions near the upstream side of the downstream side connection point D of the conduits 18 and 19. By alternately switching the valves 27a, 27b and valves 28a, 28b, the flow of the cleaning liquid flowing through the intermediate piping line Q is shut off at the time when the product liquid is sterilized and cooled by flowing in the intermediate piping line P, and on the contrary, at the time when the product liquid is sterilized and cooled in the intermediate piping line Q, the flow of the cleaning liquid flowing though the intermediate piping line P is shut off.

The mixing prevention means may include a valve 29a disposed between the valve 27a and the connection point A, a valve 29b disposed between the valve 27b and the connection point H, a valve 15a disposed between the valve 28a and the connection point C, and a valve 15b disposed between the valve 28b and the connection point J.

In an occasion when the flow in the intermediate piping line P is shut off, steam or aseptic air may enter into the conduit 18 at portions between the valves 27a and 29a and between the valves 28a and 15a to thereby prevent the foreign liquid such as cleaning liquid in the intermediate piping line P from mixing with the product liquid in the intermediate piping line Q. On the other hand, in an occasion when the flow in the intermediate piping line Q is shut off, steam or aseptic air may enter into the conduit 19 at portions between the valves 27b and 29b and between the valves 28b and 15b to thereby prevent the foreign liquid such as cleaning liquid in the intermediate piping line Q from mixing with the product liquid in the intermediate piping line P.

A cleaning method of the sterilization treatment line described above will be explained hereunder with reference to FIGS. 2 to 8.

Figure 2:
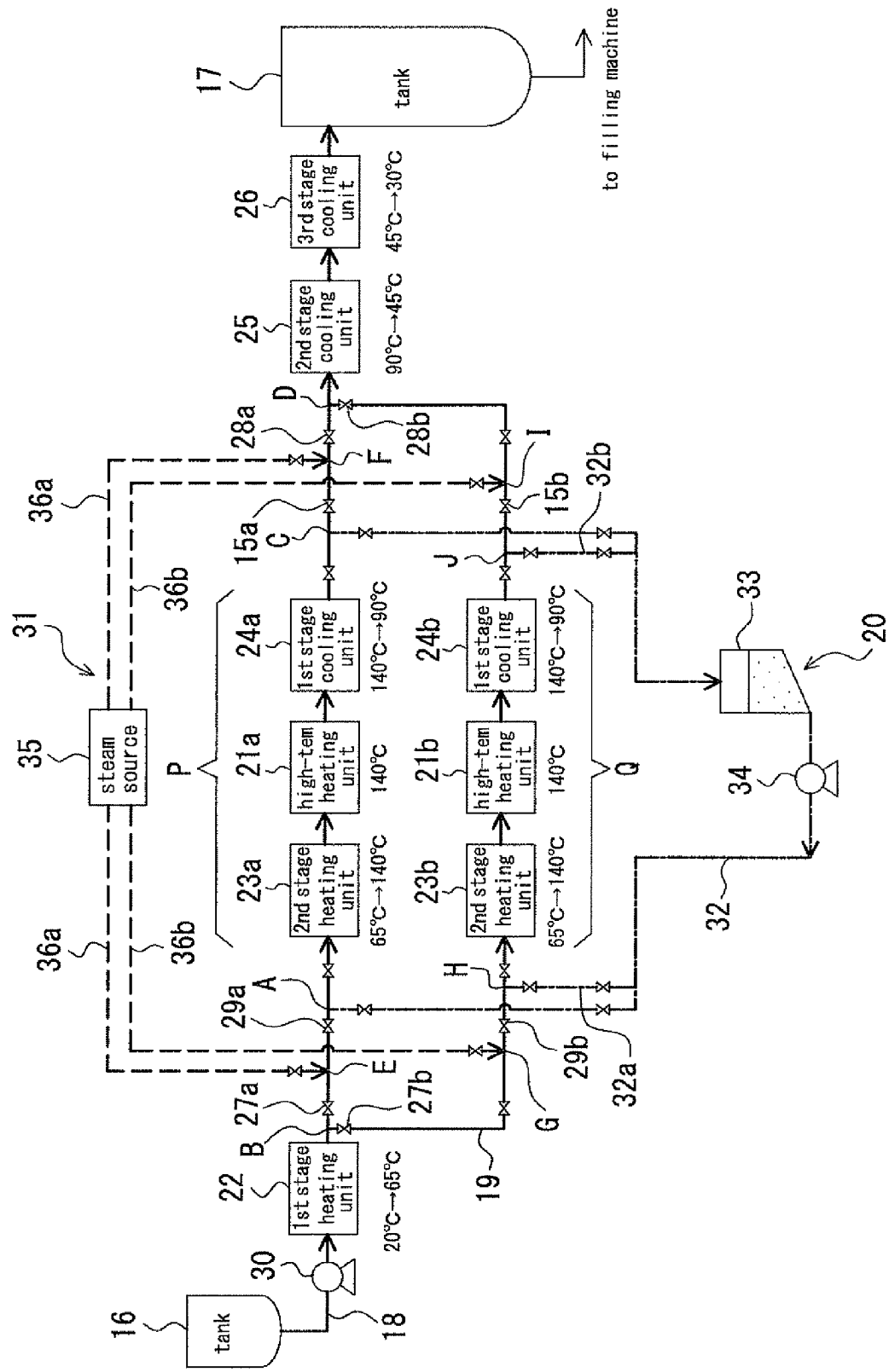
FIG. 2 is a block diagram of a sterilization treatment line which performs at least one of CIP and SIP treatments and, thereafter, maintains a positive pressure condition.

(1) CIP• SIP• Positive Pressure Keeping in Entire Sterilization Treatment Line (FIG. 2)

When the CIP system 20 is operated, the valves in association with the CIP treatment are opened, and as shown in FIG. 2 with a medium thick line (half-thick line), the cleaning liquid and/or water circulates in all the conduits 18 and 19 including two intermediate piping lines P and Q, thereby performing the CIP treatment for all the sterilization treatment line.

Subsequently, when the SIP system 31 is operated, the valves in association with the SIP treatment are opened, and as shown in FIG. 2 with a medium thick line, the high-temperature steam circulates in all the conduits 18 and 19 including two intermediate piping lines P and Q, and, hot water may be substituted for the steam. The SIP treatment is thus performed for all the sterilization treatment line.

Thereafter, the aseptic air is injected into all the sterilization treatment line by the operation of the positive pressure keeping system, and all of the conduits 18 and 19 including the intermediate piping lines P and Q are kept in an aseptic condition under positive pressure. The positive pressure may be kept by injecting aseptic water in these conduits.

Figure 3:
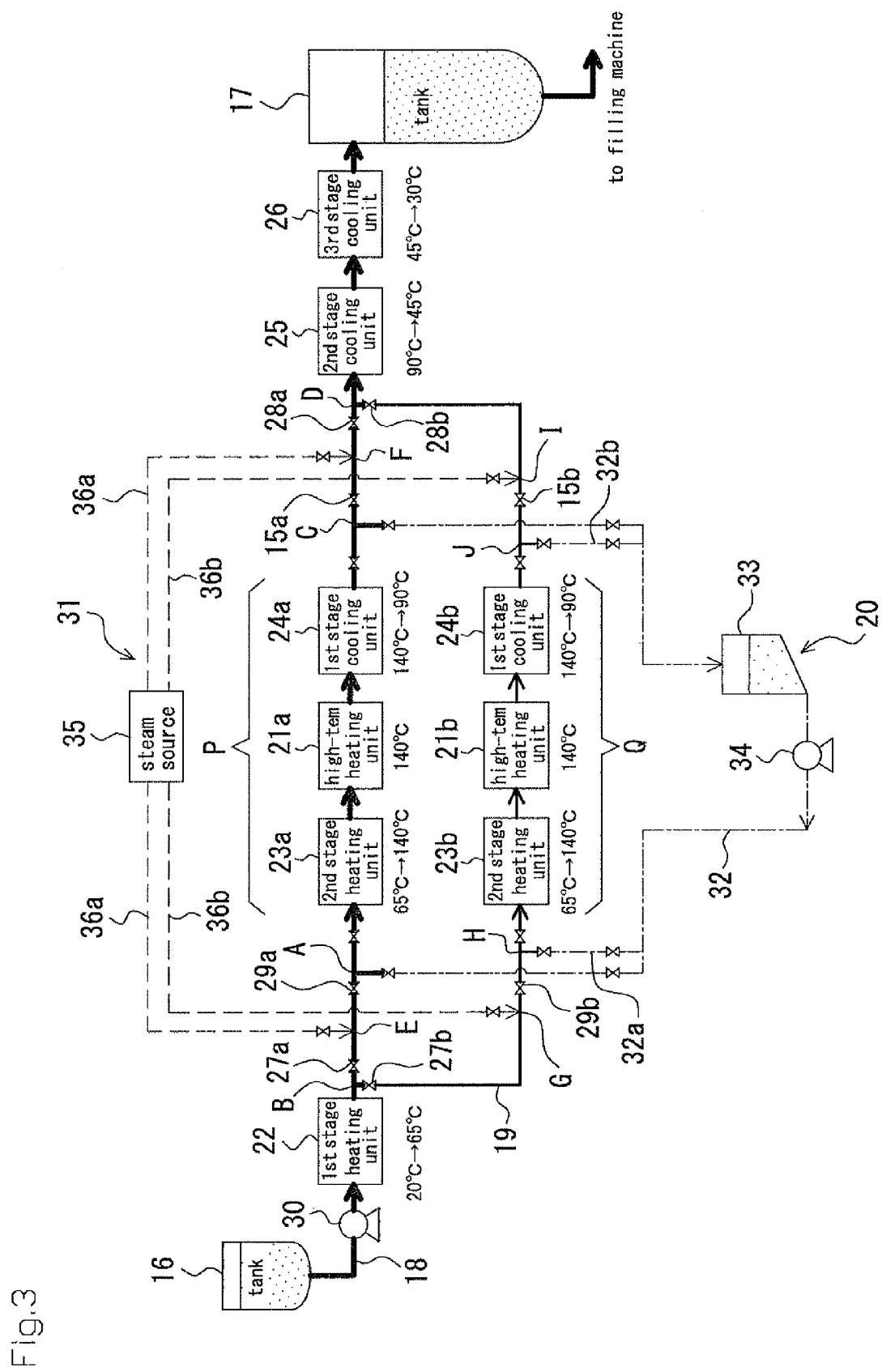
FIG. 3 is a block diagram showing a state in which product liquid is sterilized in the sterilization treatment line including one intermediate piping line, while maintaining a positive pressure in another intermediate piping line.

(2) Sterilization of Product Liquid by Sterilization Treatment Line Including One Intermediate Piping Line P (FIG. 3)

When predetermined valves such as valves 27b, 28b in the sterilization treatment line are switched, one P of the intermediate piping lines is communicated with the sterilization treatment line, and the interiors of the other one Q of the intermediate piping lines and the second conduit 19 are kept under positive pressure by the aseptic air as shown in medium thick line in FIG. 3 and the aseptic condition therein can be maintained.

Prepared product liquid is stored inside the upstream side tank 16 at a temperature of, for example, 20° C., and when the pump 30 id driven, the product liquid inside the upstream side tank 16 flows as shown in FIG. 3 with thick line.

That is, the product liquid flows in the first conduit 18, is heated in the first stage heating unit 22 to a temperature of 65° C. from 20° C., is then heated in the second stage heating unit 23a to a temperature of 140° C. from 65° C., flows in the high-temperature heating unit 21 with the temperature of 140° C. being maintained to thereby create the sterilized state, is cooled in the first stage cooling unit to a temperature of 90° C. from 140° C., is cooled in the second stage cooling unit 25 to a temperature 45° C. from 90° C., is cooled in the third stage cooling unit 26 to a temperature of 30° C. from 45° C., and thereafter, flows into the downstream side tank 17.

As explained above, since the product liquid is sterilized during the passing through the plural stages of heating units 22, 23a, 21a and the plural stages of cooling units 24a, 25, 26, even a large amount of product liquid can be smoothly heated and cooled.

The product liquid is stored in the downstream side tank 17 with a temperature of 30° C., and then delivered to the filling machine to fill a plurality of containers such as PRT bottles travelling at high speed.

Further, when the filling operation of the filling machine is temporarily stopped, the predetermined valve is switched to thereby return, to the upstream side tank 16, the product liquid sterilized during the passing through the sterilization treatment line through a conduit, not shown.

Figure 4:
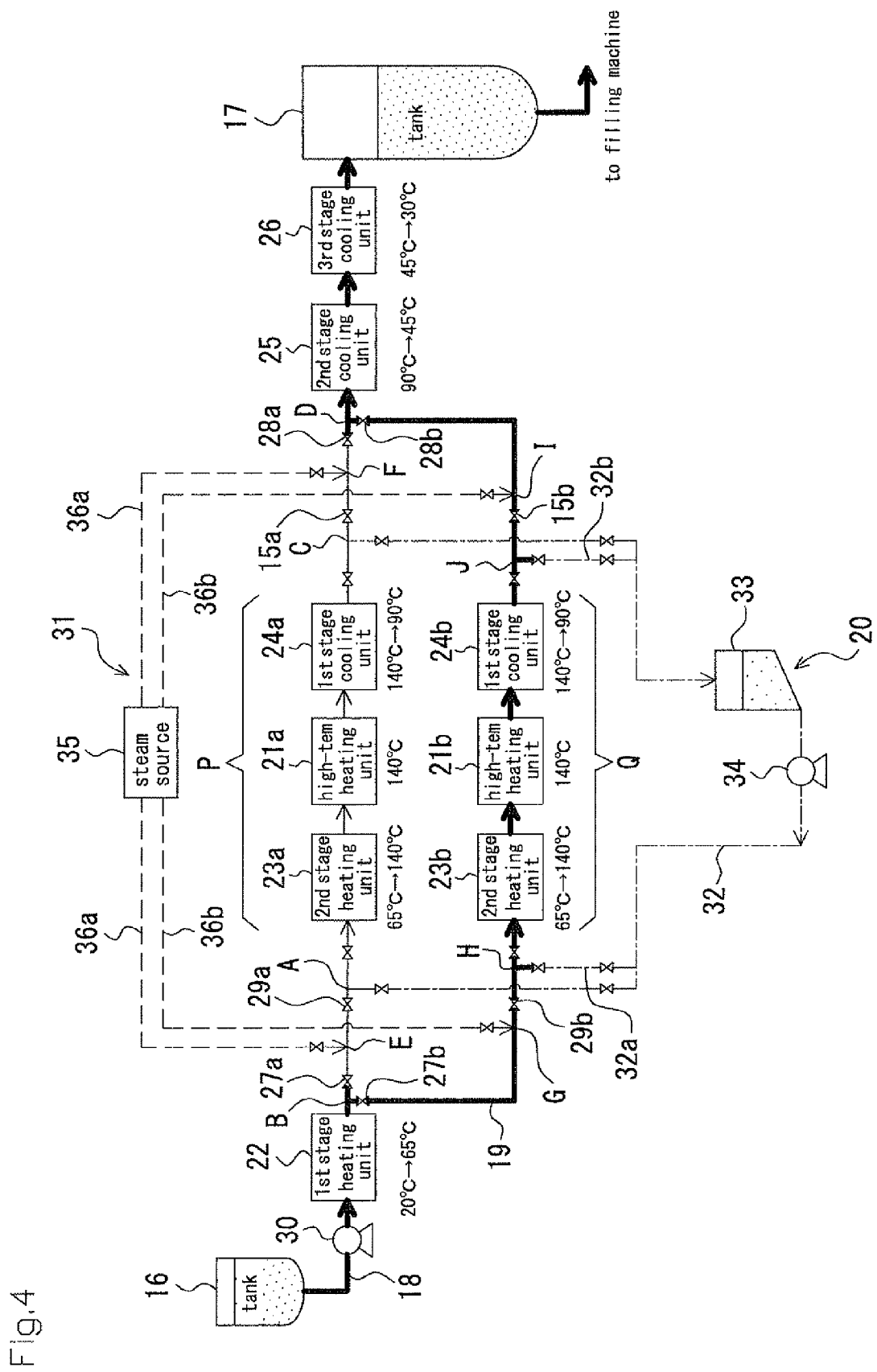
FIG. 4 is a block diagram showing a state in which the one intermediate piping line is shut off and switched to the other intermediate piping line to thereby perform the sterilization treatment to the product liquid.

(3) Sterilization of Product Liquid by Sterilization Treatment Line Including Other Intermediate Piping Line Q (FIG. 4)

At the time when the product liquid is sterilized in the sterilization treatment line including the intermediate piping line P, if the sterilization treatment and the filling working of the filling machine are performed for a long time, the burning of the product liquid may occur in the interior of the conduit 18 of the intermediate piping line P and/or the heating unit 23.

In such an occasion, the valves 27a, 27b, 28a and 28b are operated immediately to switch the flowing of the product liquid from the one intermediate piping line P to the other intermediate piping line Q.

According to this switching operation, as shown in FIG. 4 with thick line, the product liquid in the upstream side tank 16 flows in the first conduit 18, is heated by the first stage heating unit 22 from the temperature of 20° C. to 65° C., flows in the second conduit 19, and is then delivered toward the other one Q of the intermediate piping lines. Thereafter, the product liquid is heated by the second stage heating unit 23b of the intermediate piping line Q from the temperature of 65° C. to 140° C., flows in the high-temperature heating unit 21b with the temperature of 140° C. being maintained, is then cooled by the first stage cooling unit 24b from the temperature of 140° C. to 90° C., flows out of the intermediate piping line Q, is again cooled by the second stage fooling unit 25 from the temperature of 90° C. to 45° C., is cooled by the third stage cooing unit 26 from the temperature of 45° C. to 30° C., and then flows in the downstream side tank 17.

As described above, even if one P of the intermediate piping lines is shut off, the product liquid flows continuously through the other one Q of the intermediate piping lines and is sterilized during the flowing, so that the production of bottled product liquid can be continued.

Figure 5:
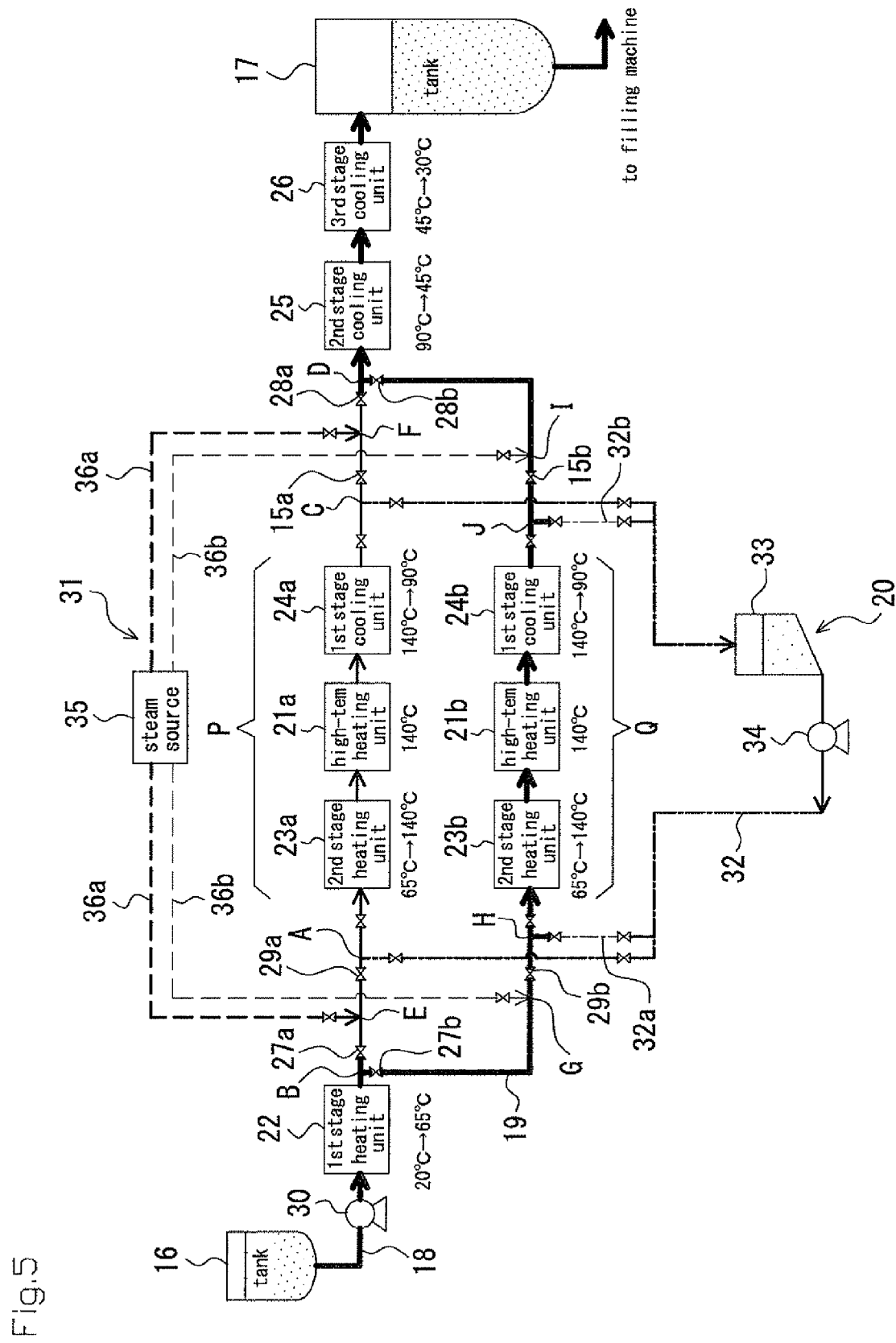
FIG. 5 is a block diagram showing a state in which the sterilization treatment to the product liquid is continued in the other intermediate piping line, while at least one of the CIP and SIP treatments is performed in the one intermediate piping line.

(4) CIP• SIP• Positive Pressure Keeping in One Intermediate Piping Line P (FIG. 5)

During the sterilization treatment process of the product liquid flowing through the other one Q of the intermediate piping lines, as shown in FIG. 5 with medium thick line, with the one P of the intermediate piping lines in which the burning occurs, the CIP system 20 is operated to operate the predetermined valve provided for the sterilization treatment line, the CIP treatment is performed by flowing the cleaning liquid or water through the intermediate piping line P as shown in FIG. 5 with thick line.

Subsequently, if occasion demands, the SIP system 31 is operated to flow the steam or hot water to thereby performing the SIP treatment.

In the CIP and/or SIP operation, both the intermediate piping lines P and Q are shut off by the valves 27a and 28a from each other so as not to flow the cleaning liquid or steam into the intermediate piping line Q. Further, both the intermediate piping lines P and Q are shut off from each other by injecting steam or hot water between the valves 27a and 19a and between the valves 15a and 28b.

Figure 6:
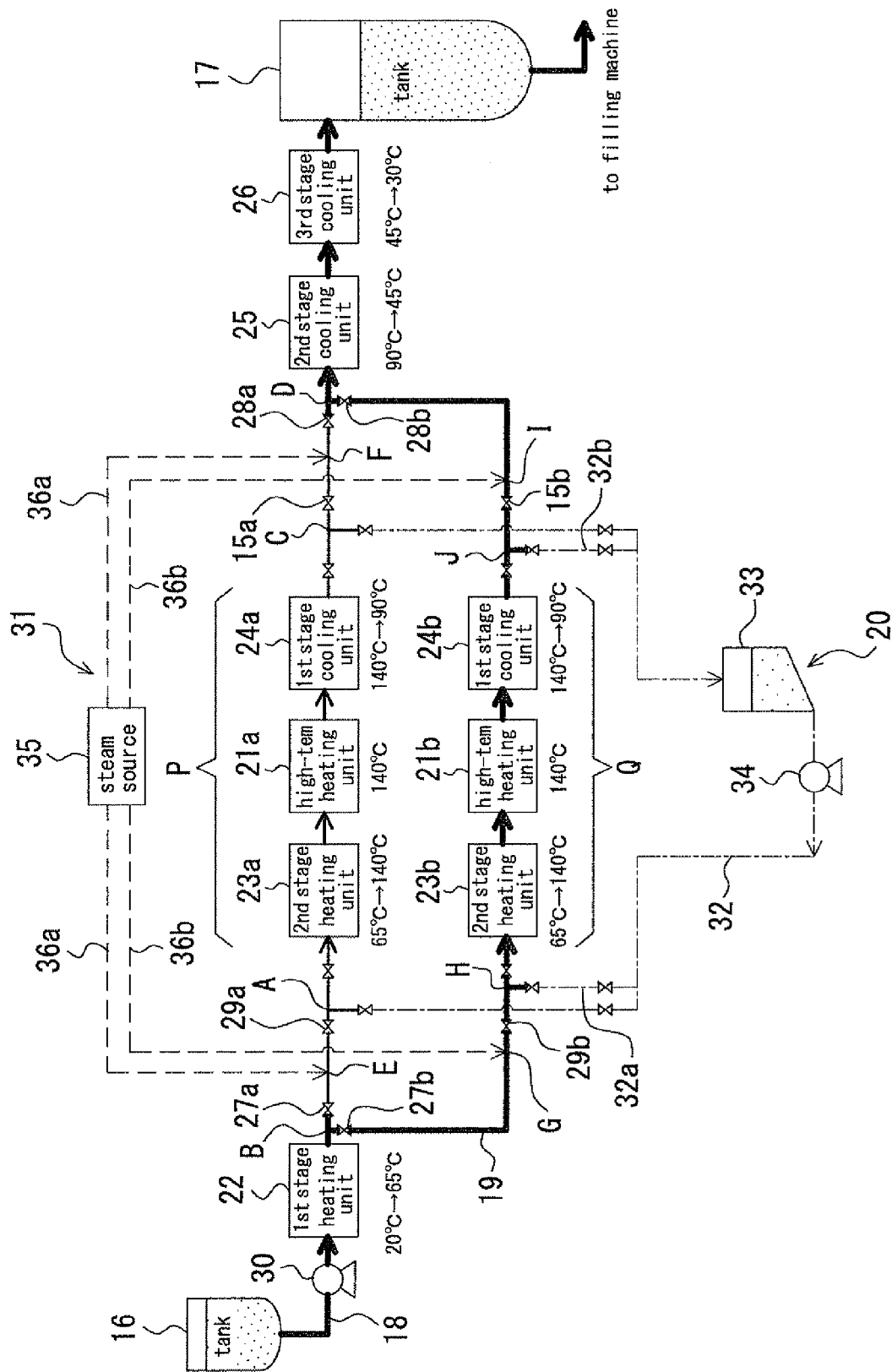
FIG. 6 is a block diagram showing a state in which the product liquid is sterilized in the sterilization treatment line including the other intermediate piping line, while maintaining the positive pressure state in the one intermediate piping line.

After the CIP and/or SIP treatment, the aseptic air is injected into the intermediate piping line P by the operation of the positive pressure keeping system as shown in FIG. 6 with medium thick line to keep the positive pressure inside the intermediate piping line P, which is hence kept under the aseptic state.

Figure 7:
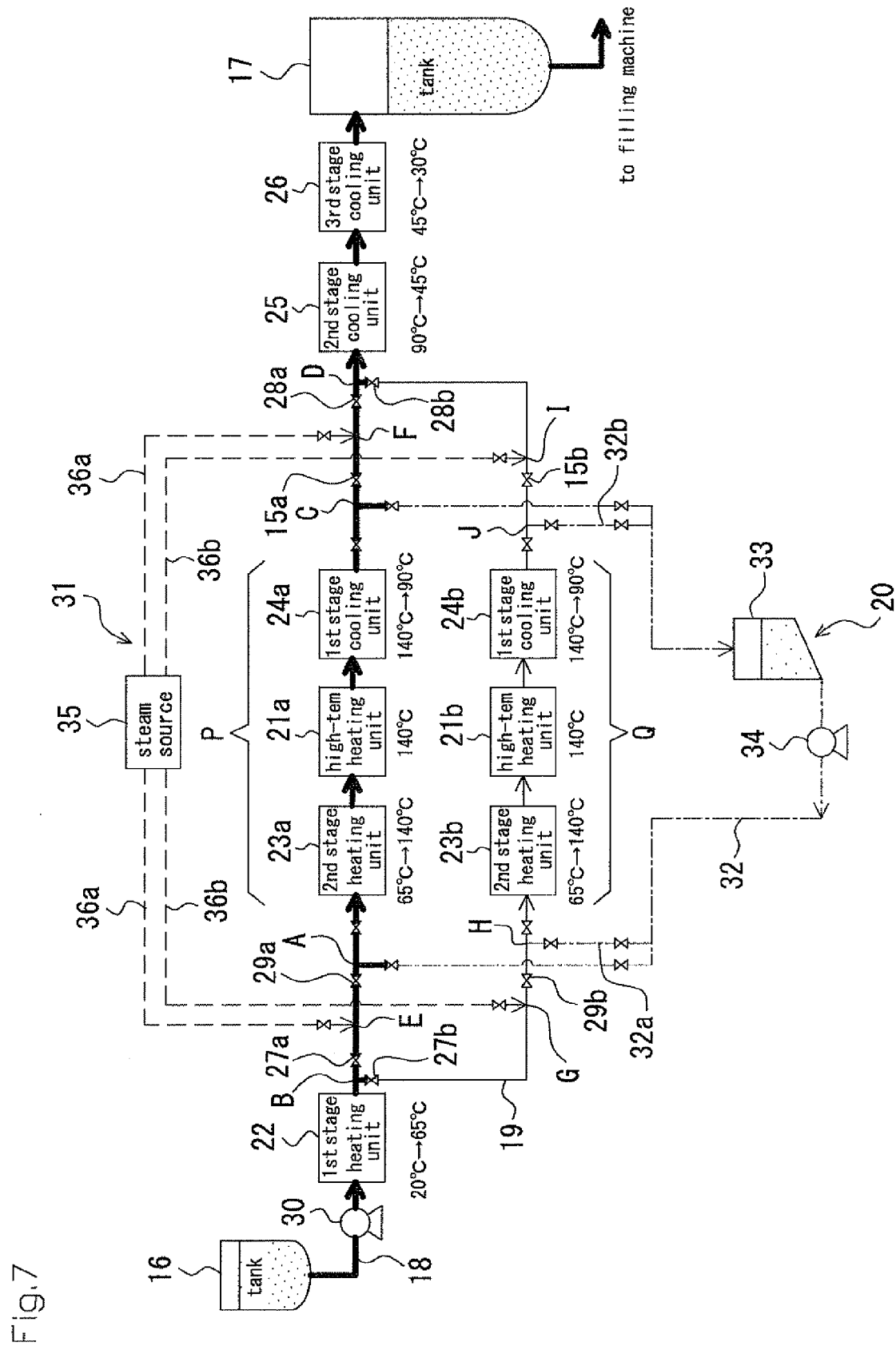
FIG. 7 is a block diagram showing a state in which the other intermediate piping line is shut off and switched to the one intermediate piping line to thereby perform the sterilization treatment to the product liquid.

(5) Sterilization of Product Liquid by Sterilization Treatment Line Including One Intermediate Piping Line P (FIG. 7)

At the time when the product liquid is sterilized in the sterilization treatment line including the intermediate piping line Q shown in FIG. 6, if the sterilization treatment and the filling working of the filling machine are performed for a long time, the burning of the product liquid may occur in the interior of the conduit of the intermediate piping line Q.

In such an occasion, the valves 27a, 27b, 28a and 28b are operated immediately to switch the flowing of the product liquid from the one intermediate piping line Q to the other intermediate piping line P.

According to this switching operation, as shown in FIG. 7 with thick line, the product liquid in the upstream side tank 16 flows in the first conduit 18, is heated by the first stage heating unit 23 from the temperature of 20° C. to 65° C., and flows toward the one P of the intermediate piping lines. Thereafter, the product liquid is heated by the second stage heating unit 23a of the intermediate piping line P from the temperature of 65° C. to 140° C., flows in the high-temperature heating unit 21a with the temperature of 140° C. being maintained, is then cooled by the first stage cooling unit 24a from the temperature of 140° C. to 90° C., flows out of the intermediate piping line P, is again cooled by the second stage fooling unit 25 from the temperature of 90° C. to 45° C., is cooled by the third stage cooing unit 26 from the temperature of 45° C. to 30° C., and then flows in the downstream side tank 17.

As described above, even if one Q of the intermediate piping lines is shut off, the product liquid flows continuously through the other one P of the intermediate piping lines, which is maintained under the aseptic state by the CIP or like treatment performed preliminarily, so that the production of bottled product liquid can be continued.

Figure 8:
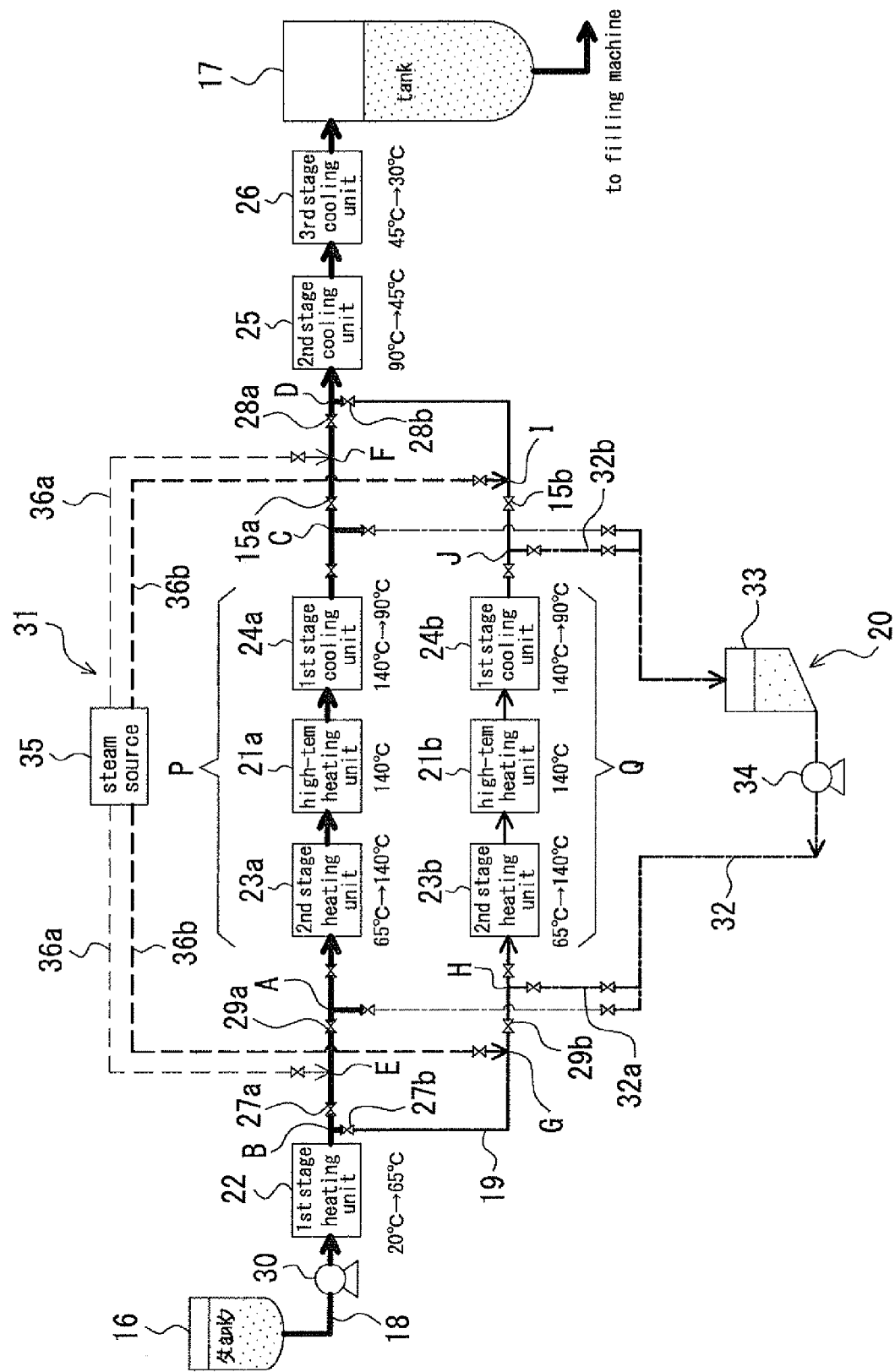
FIG. 8 is a block diagram showing a state in which the sterilization treatment to the product liquid is continued in the one intermediate piping line, while at least one of the CIP and SIP treatments is performed in the other intermediate piping line.

(6) CIP• SIP• Positive Pressure Keeping in Other Intermediate Piping Line Q (FIG. 8)

At the time when the product liquid is sterilized in the sterilization treatment line including the intermediate piping line P, if burning of the product liquid occurs in the other intermediate piping line Q, the predetermined valves in the sterilization treatment line are operated by the operation of the CIP device, and as shown in FIG. 8, the CIP treatment is performed by flowing the cleaning liquid or water in the intermediate piping line Q as shown in FIG. 8 with medium thick line. Subsequently, if occasion demands, the SIP system 31 is operated to flow the steam or hot water to perform the SIP treatment. After the CIP and/or SIP treatment, the positive pressure keeping system is operated to inject the aseptic air into the intermediate piping line Q to thereby keep the intermediate piping line Q with positive pressure state, and hence, kept the aseptic state.

(7) Thereafter, the Operations (2) to (6) mentioned above are repeated to thereby continuously perform the filling of the product liquid for a long time.

It is to be noted that although the present invention is constructed as explained hereinabove, the present invention is not limited to the described embodiments, and for example, the heating and/or cooling method of the product liquid is not limited to the plate-type heat-exchanging method, and a shell-and-tube type heat-exchanging method may be adopted. Moreover, an injection system or infusion system may be adopted. Furthermore, the number of intermediate piping lines in parallel arrangement may be increased without being limited two.

REFERENCE NUMERAL

16—upstream side tank, 17—downstream side tank, 18—conduit, 21a, 21b—high-temperature heating unit, 22, 23a, 23b—heating unit, 24a, 24b, 25, 26—cooling unit, P, Q—intermediate piping line

The invention claimed is:

1. A sterilization treatment line in which an upstream side tank in which product liquid is stored and a downstream side tank are connected to each other through a conduit through which the product liquid is transferred, the sterilization treatment line comprising:
a high-temperature heat exchanger for sterilizing the product liquid at an intermediate portion of the conduit;
plural heating stages that heat the product liquid in a stepwise manner at portions of the conduit between the upstream side tank and the high-temperature heat exchanger, the plural heating stages including a first stage heating unit adjacent to the upstream side tank and a second stage heating unit between the first stage heating unit and the high-temperature heat exchanger;
plural cooling stages that cool the product liquid in a stepwise manner at portions of the conduit between the high-temperature heat exchanger and the downstream side tank, the plural cooling stages including a first stage cooling unit adjacent to the high-temperature heat exchanger and a second stage cooling unit between the first stage cooling unit and the downstream side tank; and
a plurality of intermediate piping lines arranged in parallel with each other at portions between (a) the second stage heating unit that has a temperature range at which the product liquid is burnt and (b) the first stage cooling unit that has a temperature range at which the product liquid is burnt,
wherein the temperature range at which the product liquid is burnt is 60° C. to 150° C.,
wherein the plurality of intermediate piping lines are configured to be switched with each other, and
wherein a sterilization treatment, a cleaning treatment, and a positive pressure keeping treatment on the product liquid being transferred from the upstream side tank to the downstream side tank are performed by switching between the plurality of intermediate piping lines arranged in parallel with each other.

2. The sterilization treatment line according to claim 1, further comprising valves that prevent fluid other than the product liquid from being mixed with the product liquid flowing in the plurality of intermediate piping lines.

3. A cleaning method for a sterilization treatment line, in which an upstream side tank in which product liquid is stored and a downstream side tank are connected to each other through a conduit through which the product liquid is transferred, the method comprising:

sterilizing the product liquid with a high-temperature heat exchanger at an intermediate portion of the conduit;

heating the product liquid in plural stepwise heating stages at portions of the conduit between the upstream side tank and the high-temperature heat exchanger, the plural stepwise heating stages including a first stage heating unit adjacent to the upstream side tank and a second stage heating unit between the first stage heating unit and the high-temperature heat exchanger;

cooling the product liquid in plural stepwise cooling stages at portions of the conduit between the high-temperature heat exchanger and the downstream side tank, the plural stepwise cooling stages including a first stage cooling unit adjacent to the high-temperature heat exchanger and a second stage cooling unit between the first stage cooling unit and the downstream side tank, wherein the conduit includes a plurality of intermediate piping lines arranged in parallel with each other at portions between (a) the second stage heating unit that has a temperature range at which the product liquid is burnt and (b) the first stage cooling unit that has a temperature range at which the product liquid is burnt, wherein the temperature range at which the product liquid is burnt is 60° C. to 150° C.; and performing the sterilization treatment, a cleaning treatment, and a positive pressure keeping treatment on the product liquid being transferred from the upstream side tank to the downstream side tank, wherein the sterilization, cleaning, and positive pressure keeping treatments are performed by switching between the plurality of intermediate piping lines arranged in parallel with each other.

4. The cleaning method for a sterilization treatment line according to claim 3, wherein the sterilization treatment is performed at an interval between the cleaning treatment and the positive pressure keeping treatment.

* * * * *